United States Patent [19]

Baisch et al.

[11] Patent Number: 4,612,709
[45] Date of Patent: Sep. 23, 1986

[54] APPARATUS FOR MEASURING POSITIONAL MOVEMENT OF A NUMERICALLY CONTROLLED MACHINE TOOL

[75] Inventors: Roderich Baisch; Horst Gose; Wolfgang Papiernik, all of Erlangen, Fed. Rep. of Germany

[73] Assignee: Siemens Aktiengesellschaft, Munich, Fed. Rep. of Germany

[21] Appl. No.: 753,246

[22] Filed: Jul. 9, 1985

[30] Foreign Application Priority Data

Jul. 20, 1984 [DE] Fed. Rep. of Germany ....... 3426863

[51] Int. Cl.$^4$ .............................................. G01B 7/02
[52] U.S. Cl. .............................. 33/125 R; 33/125 C; 33/556
[58] Field of Search ................. 33/1 M, 125 R, 125 A, 33/125 C, 556, 503, 504, 505, 179.5 D

[56] References Cited

U.S. PATENT DOCUMENTS

| 4,276,700 | 7/1981 | Tanno et al. | 33/179.5 D |
| 4,333,238 | 6/1982 | McMurtry | 33/503 |
| 4,356,556 | 10/1982 | Sterki | 33/179.5 D |

FOREIGN PATENT DOCUMENTS

| 1214307 | 4/1966 | Fed. Rep. of Germany . |
| 1548690 | 4/1970 | Fed. Rep. of Germany . |
| 2086568 | 5/1982 | United Kingdom . |

*Primary Examiner*—Willis Little
*Attorney, Agent, or Firm*—Kenyon & Kenyon

[57] ABSTRACT

An apparatus for measuring the positional movement of a movable workpiece of a numerically controlled machine tool. The apparatus comprises an incremental linear measuring system arranged along the path of movement of the movable workpiece, a rotary measuring system, mechanically coupled to a drive of the movable workpiece, and means within the computer control of the machine tool to relate the resulting measurements from the two systems to one another. The measuring resolution of the rotary measuring system is substantially greater than that of the incremental linear measuring system such that if the rotary measuring system is subordinated to the incremental linear measuring system, the machine tool can achieve greater control accuracy with respect to stopping and positioning the workpiece. The apparatus can also be configured to measure characteristics of the machine tool such as spindle pitch, spindle pitch error, and backlash and correct any control inaccuracies accordingly.

6 Claims, 1 Drawing Figure

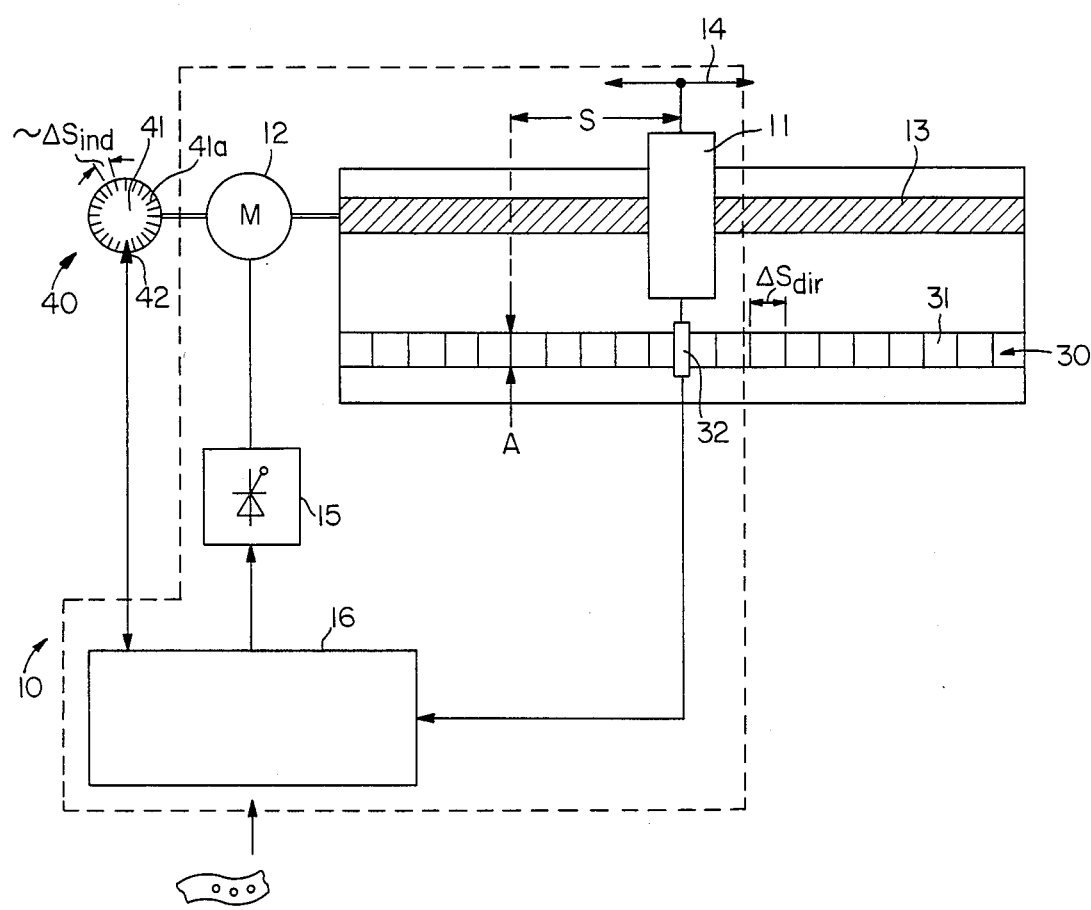

4,612,709

APPARATUS FOR MEASURING POSITIONAL MOVEMENT OF A NUMERICALLY CONTROLLED MACHINE TOOL

TECHNICAL FIELD

The invention relates to an apparatus for measuring the positional movement of a movable part of a mechanical device, such as, a numerically controlled machine tool.

BACKGROUND OF THE INVENTION

At present, machine tools utilize measuring systems/devices which take positional measurements of a movable machine tool part along the part's plane of movement. A typical direct position measuring system of the type described above can be found in German Patent No. 12 14 307. The patent describes a measuring system having a measurement scale which is designed as purely incremental, for instance, as a glass scale with divisions or as an inductive linear scale, in which, the voltages generated by the movement of the machine tool part and taken off are ultimately reconverted into pulses that are then counted. The above-mentioned patent also teaches that several periodically graduated analog measuring systems can be provided simultaneously in order to cover a large measuring range.

One disadvantage of a direct position measuring system as described is the relatively low resolution of the measurements. In any such incremental position measuring system, the range of measuring uncertainty is plus or minus one ($\pm 1$) increment. Secondly, this range of uncertainty contributes to a hysteresis effect in the position control feedback loop of the drive control system whereby the position feedback signal can undergo amplitude oscillations of a magnitude of $\pm 1$ increment. This, in turn, causes the movable part of the machine tool to oscillate during movement and stopping.

It is therefore an object of the present invention to develop a position measuring apparatus whose resolution is at least two to three times greater than the desired measuring accuracy in order to keep the reactions on the workpiece small.

It is also an object of the present invention to develop a position measurement apparatus whose measuring accuracy can be increased substantially by relatively simple means.

SUMMARY OF THE INVENTION

The foregoing problems are solved by the invention which is an apparatus for measuring positional movement of a movable part of a mechanical device, comprising: (a) direct position measuring means, (b) indirect position measuring means which is mechanically coupled to a drive of the movable part of the mechanical device, and whose measuring resolution is at least four times greater than the measuring resolution of the direct position measuring means, and (c) means for relating the measurement values of both position measuring means to each other.

Advantageously, the measuring accuracy of the apparatus can be increased further by setting the measuring resolution of the indirect position means to be at least ten times greater than the measuring resolution of the direct position measuring means.

Through the combination of direct and indirect measuring means, various improvements relating to a position control are possible, for instance, an oscillation-free precision stop can be achieved by the direct measuring means using a subordinate indirect measurement with higher resolution. Secondly, the invention, which can call upon a subordinate indirect measurement, can be utilized for interpolation purposes and thus increase the position control and contour accuracy of the machine tool. The invention can further increase position control accuracy by its ability to determine automatically and accurately spindle pitch error of the spindle used for driving the movable machine tool part (for example, by forming the ratio of the two measuring systems' measurement values) as well as to determine the backlash in the mechanical system.

Finally, the use of indirect measuring means frequently does not lead to excessive costs because under some circumstances, such measuring means can be used at the same time as replacement for a tachometer since the frequency of the pulses generated by said means is a measure for the speed of rotation of the motor.

BRIEF DESCRIPTION OF THE DRAWINGS

For better understanding of the invention, reference is made to the following description of an exemplary embodiment thereof and the accompanying drawing therein:

FIG. 1 is a schematic diagram of a machine tool and an apparatus for measuring positional movement of the tool's movable part.

DETAILED DESCRIPTION

FIG. 1 shows a schematic representation of a typical machine tool 10 comprising a movable workpiece, such as, a feed slide 11, a d-c motor 12, serving as the drive, and a spindle 13 which is driven by the motor 12 to move the feed slide 11. This feed slide 11 can be moved along the length of the spindle 13 in the direction of the double arrow 14 as shown in FIG. 1. The motor 12 is supplied from a rectifier device 15 which receives its control commands from a known computer control 16 via appropriate position, speed and current control circuits not shown. As a rule, the position and speed control circuits are part of the computer control 16 proper.

FIG. 1 also illustrates a schematic representation of an apparatus for measuring the positional movement of the feed slide 11. The apparatus comprises (a) an incremental linear measuring system 30 which consists of a scale 31 proper, parallel to the spindle 13 and, therefore, to the path of the slide 11 to be moved, and an associated sensor head 32 mechanically connected to the slide 11, (b) an indirect rotary measuring system 40 which consists of a pulse disc 41, mechanically coupled to the motor 12 and having pulse marks 41a at the circumference thereof, and a stationary sensor 42, and (c) means within the computer control 16 to receive signals from both the sensor head 32 and the stationary sensor 42.

The scale 31 of the incremental linear measuring system 30 has a measuring resolution $\Delta S_{dir}$ relating to the distance between each scale 31 division and determined, for instance, from the grating constant of the scale 31. The pulse disk 41 of the indirect rotary measuring system 40 has a measuring resolution $\Delta S_{ind}$ approximated by the distance between each pulse mark 41a and determined from the number of pulse marks 41a and the pitch G of the spindle 13. The measuring resolution $\Delta S_{ind}$ is chosen to be larger, for example, by a factor of ten, than the measuring resolution $\Delta S_{dir}$.

In operation, the computer control 16 commands the rectifier device 15, via control circuitry not shown, to supply the machine tool motor 12 with a specified speed and current. The motor 12 then drives the spindle 13 according to the position control command so as to move the feed slide 11 to a desired position. The present invention takes simultaneous position measurements of the linear movement of the feed slide 11 and the rotary movement of the motor 12 during such an operation cycle.

As the slide 11 moves, the mechanically-coupled sensor head 32 of the incremental linear measuring system 30 moves along the scale 31. As the head 32 passes each scale 31 division, a corresponding pulse is provided by the head 32 and fed to the computer control 16. Simultaneously with the slide 11 movement, the pulse disk 41 of the indirect rotary measuring system 40 rotates in response to the driving action of the motor 12 to which it is mechanically-coupled. As each pulse mark 41a on the disk 41 passes the stationary sensor 42, the sensor 42 generates a pulse which is fed to the computer control 16.

Note that approximately 10 pulse marks 41a will rotate past the sensor 42 for every scale 31 division which head 32 passes if the measuring resolution $\Delta S_{ind}$ is ten times larger than the measuring resolution $\Delta S_{dir}$. The computer control 16 then relates the measurement signals received from the head 32 and the sensor 42 and adjusts the position control command to the motor 12 accordingly.

As an example, if the slide 11, is to be brought into the desired position A shown in FIG. 1 and a precision stop is to be achieved there without oscillation, the linear measuring system 30 can first be used by the computer control 16 for moving the slide 11 from the position shown. For this purpose, for instance, a number of pulses corresponding to the scale 31 divisions in distance s is set in a counter (not shown) in the computer control 16 and this counter is counted back by each pulse coming from the sensor head 32 as it moves along the scale 31 with the slide 11. The state of the counter is used by the computer control 16 for controlling the motor 12. Once the state of the counter is zero (i.e., position A is reached by the slide 11), the indirect measuring system 40 is switched on inside the computer control 16. The indirect measuring system 40 is then used to control the motor 12. Oscillations of the slide 11 upon stopping would normally arise from the spacing/division size of the linear scale 31 (i.e., corresponding to the range of uncertainty of ±1 scale 31 division) if the linear measuring system 30 controlled the motor 12. However, the indirect measuring system 40 which has a substantially higher resolution (i.e. smaller range of uncertainty) can now obtain a precision stop for the slide 11.

The indirect measuring system 40 can also be used for increasing the machine tool control accuracy in such a manner that the indirect measuring system 40 is utilized not only for precision stopping, but, additionally for interpolation. It has been previously noted that if the measuring resolution of the indirect measuring system 40 is ten times greater than that of the direct measuring system 30, ten measuring increments of the system 40 fall on one measuring increment of the system 30. Therefore, if the computer control 16 switches to the indirect measuring system 40 after the slide 11 reaches position A, nine further intermediate positions can be reached by the slide 11 until the next increment of the linear scale 31 becomes effective again. By the switching, the control accuracy of the machine tool with respect to the positioning of the slide 11 is consequently increased by a factor of ten in the foregoing example.

Apart from using a cascaded measuring configuration, the present invention can contribute to increased machine tool control accuracy by determining the pitch G of the spindle 13 as well as possible spindle pitch errors automatically by a comparison of angle increments. The computer control 16 forms a ratio of the measurement values to measure the pitch G and pitch error in the following manner:

(a) For a distance s travelled by the slide 11, $$S = \Delta S_{dir} \cdot u,$$

and $$S = \Delta S_{ind} \cdot v$$

where u, v are integral numbers;

(b) As noted previously, $\Delta S_{dir}$ is determined from grating constant of the linear scale 31 and $\Delta S_{ind}$ is given by the number N of pulse marks 41a of the pulse disc 41 and the pitch G of the spindle 13: $\Delta S_{ind} = G/N$; and (c) setting the two equations in (a) equal to one another and substituting therein the relationship of (b), results in an expression that solves for the pitch G of the spindle 13:

$$\Delta S_{dir} \cdot u = (G/N) \cdot v$$

and, therefore, $$G = \Delta S_{dir} \cdot N \cdot u/v$$

Note that above expression informs the computer control 16 that for any spindle 13 with constant spindle pitch G, the ratio u/v must also be constant. Consequently, spindle pitch errors can be determined by the computer control 16 automatically by continually evaluating the ratio u/v. The computer control 16 can then adjust its control commands to the motor 12 or signal an operator if necessary.

Further improvement in the machine tool control accuracy is achievable by the present invention which can be configured to determine automatically the backlash of the motor 12. Backlash is the relative movement of the interacting parts within the motor 12 resulting from looseness. Thus, the motor 12 carries an inherent inaccuracy such that the distance travelled by a machine tool workpiece set by the normal rotation of the motor 12 will differ when the motor 12 rotation is reversed and the workpiece moves back to its starting point. The backlash can be determined and compensated by setting a correction valve, via a position control command, to the machine tool workpiece.

Starting out from a course position on the linear scale 31, for instance, a position zero, the feed slide 11 is moved in one direction until a transition to the next course position is indicated by the direct measuring system 30. Then, the computer control 16 commands the direction of movement of the motor 12 to be reversed. The mentioned backlash is then given by the number of distance increments, i.e. pulse marks 41a, registered by the indirect measuring system 40 from the time of the reversal of the direction of movement to reaching the coarse position zero again by the measuring system 30. For an indirect measuring system 40 which has a measuring resolution ten times greater than the direct measuring system 30, the number of pulse marks 41a registered should be ten if no backlash is present. If backlash exists, then the pulse mark 41a count will be higher. The computer control 16 will take the difference between the registered count and the theoretical count, compute a correction value and issue a position control command to feed slide 11 to compensate for the additional rotation that occurred.

It is to be understood that the embodiments described herein are merely illustrative of the principles of the invention. Various modifications may be made thereto by persons skilled in the art without departing from the spirit and scope of the invention.

What is claimed is:

1. An apparatus for measuring positional movement of a movable workpiece of a machine tool, comprising:
   (a) direct position measuring means, arranged along the path of movement of the movable workpiece;
   (b) indirect position measuring means, mechanically coupled to a drive of the movable workpiece and having a measuring resolution at least four times greater than the measuring resolution of said direct position measuring means; and
   (c) means for relating resulting measurement values of both position measuring means with each other and for automatically determining spindle pitch and spindle pitch error of a spindle coupled to the drive so that the control accuracy of the machine tool can be improved.

2. An apparatus as recited in claim 1 wherein the measuring resolution of the indirect position measuring means is at least ten times greater than the measuring resolution of the direct position measuring means.

3. An apparatus as recited in claim 1 wherein the indirect position measuring means is subordinated to the direct position measuring means.

4. An apparatus for measuring positional movement of a movable workpiece of a machine tool, comprising:
   (a) direct position measuring means, arranged along the path of movement of the movable workpiece;
   (b) indirect position measuring means, mechanically coupled to a drive of the movable workpiece and having a measuring resolution at least four times greater than the measuring resolution of said direct position measuring means; and
   (c) means for relating resulting measurement values of both position measuring means with each other and for automatically measuring and correcting reversal backlash between the indirect measuring means and the movable workpiece.

5. An apparatus as recited in claim 4 wherein the measuring resolution of the indirect position measuring means is at least ten times greater than the measuring resolution of the direct position measuring means.

6. An apparatus as recited in claim 4 wherein the indirect position measuring means is subordinated to the direct position measuring means.

* * * * *